JACOB HENDRICH
INVENTOR.

BY
AGENT.

Patented June 20, 1950

2,512,330

UNITED STATES PATENT OFFICE 2,512,330

DUAL RANGE RADIO ALTIMETER HAVING AUTOMATIC RANGE SWITCHING MEANS

Jacob Hendrich, Eindhoven, Netherlands, assignor, by mesne assignments, to Hartford National Bank and Trust Company, Hartford, Conn., as trustee Application April 26, 1946, Serial No. 665,306
In the Netherlands May 1, 1942

Section 1, Public Law 690, August 8, 1946
Patent expires May 1, 1962

7 Claims. (Cl. 343—14)

Distance meters, more particularly altimeters, which serve to determine the height of aircraft above the surface of the earth and designed for measuring greatly varying distances, have the drawback that over at least part of the scale an inexact indication of the distance to be measured is obtained. More particularly with altimeters with which the distance to be measured varies between 0 and, say 1000 metres or more and with which it is necessary to be able to verify in particular the altitudes comprised between 0 metre and 100 metres, which altitudes occur in landing, it is of great importance that in the range of from 0 to 100 metres as well as at greater altitudes an easily readable indication of the altitude should be obtained.

According to the invention, this is achieved by utilizing a distance meter having at least two measuring ranges, wherein the change-over of the measuring range is automatically effected in dependence on a voltage which depends on the distance to be measured. A distance meter with which the measuring range is automatically changed-over, has the advantage that the attention of the pilot is not diverted by the change-over of the measuring range, which is of particular importance if the change-over of the measuring range takes place during the landing.

Figure 1:
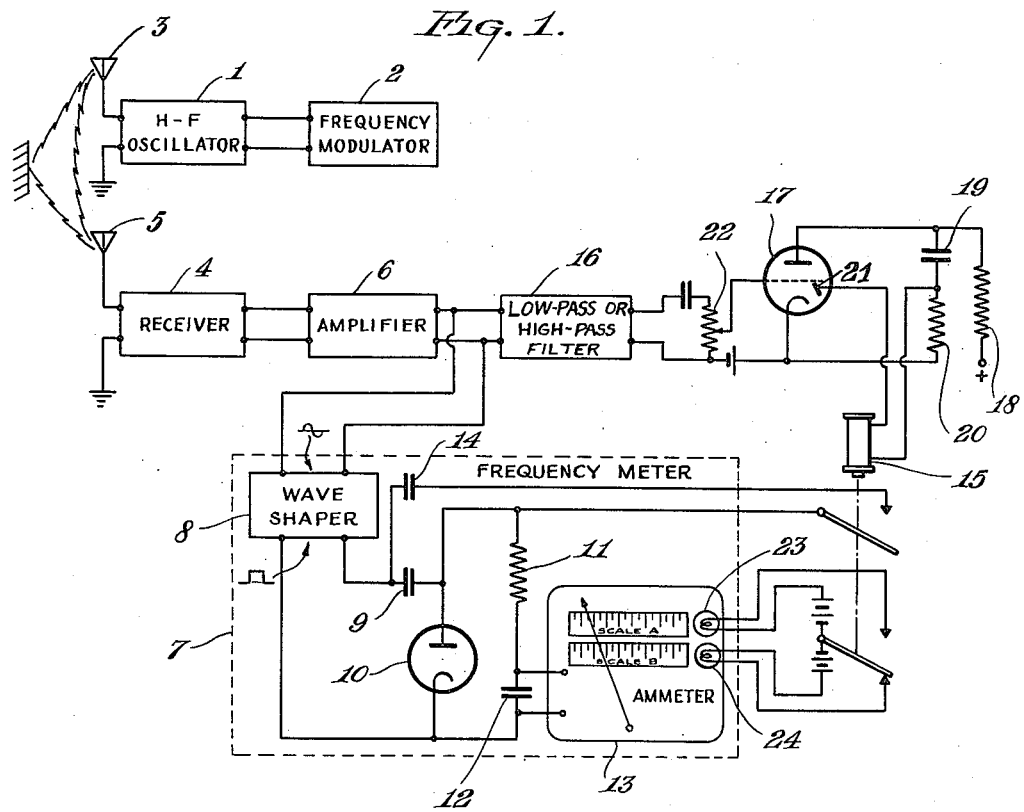
Figure 2:
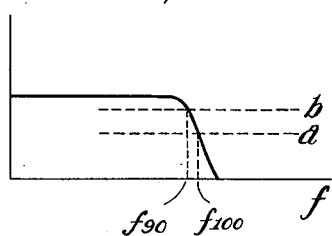

The invention will be explained more fully in reference to the accompanying drawing wherein:

Fig. 1 represents, by way of example, one mode of realisation of an altimeter according to the invention whilst Fig. 2 relates to the operation of the device according to Fig. 1.

The embodiment of an aircraft altimeter which is represented in Fig. 1 has two measuring ranges, for example of from 0 to 100 metres and of from 100 to 1000 metres or more and is of the type wherein oscillations modulated in frequency are transmitted and, owing to the cooperation of the oscillations transmitted and the oscillations received after reflection, an indication signal is obtained, the altitude to be measured being determined by the frequency of this signal. To that end the altimeter according to Fig. 1 comprises a generator 1 which generates high-frequency oscillations which are modulated in frequency by the, preferably saw-tooth shaped, oscillations generated by an oscillator 2, the oscillations modulated in frequency being transmitted by the aerial 3. The altimeter furthermore comprises a receiving device 4 which is connected to a receiving aerial 5 and in which the transmitted oscillations which directly reach the receiving aerial are mixed with the oscillations occurring, after reflection from the surface of the earth, in the receiving aerial. Then the indication signal which is obtained after mixing and whose frequency determines the altitude to be measured, is supplied via an amplifier 6 to a frequency meter 7 which comprises a device 8 for converting the sinusoidal oscillation supplied to the frequency meter into a rectangle-shaped oscillation of the same frequency and of constant amplitude. The output circuit of the device 8 comprises the series-connection of a condenser 9 and a rectifier 10 whose anode is connected to the cathode through the intermediary of a resistance 11 and an ammeter 13 shunted by a condenser 12.

During every positive half-cycle of the rectangle-shaped oscillations set up in the output circuit of the device 8 the condenser 9 is charged through the rectifier 10, whereas during every negative half-cycle wherein a voltage which is negative with respect to the cathode is supplied to the anode of the rectifier and consequently the tube 10 ceases to conduct, the condenser is discharged through the resistance 11 and the ammeter 13. The time constant of the discharge circuit is so chosen that during every negative half-cycle the condenser 9 is substantially discharged. Since the amplitude of the rectangle-shaped voltage by which the condenser is charged is constant, the charge which flows through the ammeter 13 in every cycle of this voltage is likewise constant. The average intensity of the current flowing through the ammeter is determined, however, by the number of discharges of the condenser 9 per second and consequently by the frequency of the indication signal which is supplied to the frequency meter 7 and whose frequency determines the altitude to be measured. The deflection of the ammeter 13 is consequently a measure of the distance to be measured.

In order to obtain, when altitudes located within the lowest measuring range are measured, a greater deflection of the ammeter 13 than is possible with the aid of the device hitherto described, the frequency meter 7 is provided with a condenser 14 which, upon the change-over to a lower measuring range, is connected in parallel with the condenser 9 so that the resulting capacity in the output circuit of the device 8 increases. In this case the charge flowing in the output circuit of the device 8 during every positive half-cycle of the rectangle-shaped voltage is greater so that at the same frequency the ammeter 13 exhibits a greater deflection.

The change-over to another measuring range is automatically effected by means of a relay 15 which, upon the change-over from the higher to the lower one of two adjacent measuring ranges, is excited by a voltage depending on the altitude to be measured, and which, upon the change-over from the lower to the higher measuring range, is released owing to the decrease of the said voltage below a determined value.

The voltage for the change-over of the measuring range, which voltage depends on the altitude to be measured, is taken from the output circuit of a low-pass filter 16 whose transmission characteristic, i. e. the curve which represents the amplitude of the oscillations passed as a function of frequency, is represented in Fig. 2 and to which is supplied the indication signal of constant amplitude which occurs in the output circuit of the amplifier 6. The receiving device 4 should therefore preferably be provided with a device, known per se, for keeping constant the amplitude of the indication signal occurring in the output circuit so that, independently of the altitude measured, the amplitude of the signal supplied to the filter is constant whilst the frequency of the altitude to be measured is dependent on the altitude to be measured. The pass range of the filter should preferably be so chosen that at least the frequency $f_{100}$ (the frequency corresponding to 100 meters) of the indication signal which is obtained in measuring the highest altitude located within the lowest measuring range, and preferably also the frequency corresponding to the smallest altitude located within the highest measuring range are located on the oblique flank of the transmission characteristic.

In the output circuit of the filter there occur in this case oscillations whose amplitude, for all frequencies corresponding to the altitudes located in the lowest measuring range, is greater and for all frequencies corresponding to greater altitudes is smaller than the amplitude of the above-mentioned frequency $f_{100}$. The oscillations occurring in the output circuit are supplied to an amplifying tube 17, whose output circuit comprises a resistance 18. Then the amplified oscillations developed across the resistance 18 are rectified, via a coupling condenser 19 and a resistance 20, by means of a diode formed by an electrode 21 and the cathode and arranged within the tube 17, a relay 15 being incorporated into the output circuit.

The curve which represents the course of the direct-current voltage set up across the relay 15 as a function of the indication signal, in the present case the altitude to be measured, corresponds to the course of the transmission curve of the filter 16 and may therefore also be represented by the curve in Fig. 2.

In any known manner, for example by means of a potentiometer resistance 22 in the input circuit of the amplifying tube 17, the circuit-arrangement is adjusted in such manner that the relay 15 is excited or released when the direct-current voltage occurring in the output circuit of the detector increases to above or decreases to below respectively the value which corresponds to the smallest or greatest altitude respectively of the higher or lower measuring range respectively.

If therefore the altitude measured is smaller than the greatest altitude located within the lower measuring range, the relay 15 is excited and the condenser 14 is connected in parallel with the condenser 9 so that the altimeter is adjusted so as to indicate with great accuracy altitudes located within the lower measuring range. If, however, the altitude measured exceeds the greatest altitude of 100 metres which is located within the lower measuring range, the rectified voltage sinks to below the value of the voltage occurring upon reception of the frequency $f_{100}$ and the relay is released. At this moment the condenser 14 is switched out of circuit with the result that the change-over to the higher measuring range is brought about.

Since as a rule a voltage at which the relay 15 is released, which voltage is represented in Fig. 2 by a dotted line $a$, is lower than the voltage at which the relay 15 responds, which voltage is represented by a dotted line $b$, the change-over from the higher measuring range to the lower measuring range by means of the relay 15 will take place at an altitude lower than the altitude corresponding to the frequency $f_{100}$. The frequency corresponding to the altitude at which the change-over from the higher measuring range to the lower measuring range takes place, is represented in Fig. 2 by $f_{90}$.

By reducing the hysteresis of the relay 15 it is possible to limit the distance between the greatest altitude located within the lower measuring range and the smallest altitude located within the higher of the two adjacent measuring ranges. Moreover, this distance is smaller according as the oblique flank of the transmission curve of the filter 16 is more inclined.

Since the operation for changing-over from the one measuring range to the other is not performed by the pilot himself and since without any indication the latter consequently does not know whether a change-over has taken place or not, it is advisable to provide means for indicating the measuring range which is switched in. For this purpose the relay 15 may be provided with an additional contact by which, upon the change-over to the higher measuring range, a lamp is switched into circuit by means of which an indication is obtained that the scale has to be multiplied by ten.

It is also possible to provide the indicating instrument on which the altitude is read off, with a separate scale A and B for each measuring range, means being provided for indicating the scale pertaining to the measuring range which is switched in. The latter means may consist of two lamps 23 and 24 for scale illumination which each serve for the illumination of one of the scales and of which always only that lamp is switched into circuit, by means of an additional set of contacts of the relay 15, which illuminates the scale pertaining to the measuring range which is switched in.

In the mode of realization described with reference to Fig. 1 use is made of a low-pass filter 16. It is evident, however, that, if desired, use may be made of a high-pass filter which passes the frequencies corresponding to the altitudes located within the higher measuring range. In this case the filter is so dimensioned, that at least the frequency corresponding to the smallest altitude located within the lower one of two adjacent measuring ranges and preferably also the frequency corresponding to the greatest altitude located within the lower one of these measuring ranges, is located on the oblique flank of the transmission curve of the filter. More in general it may be said that with the use of a low-pass filter as well as with the use of a high-pass filter the frequency corresponding to an altitude common to both measuring ranges should preferably be located on the oblique flank of the transmission curve.

With the use of a high-pass filter it is, moreover, desirable that use should be made of a relay having an open-circuit contact since in this case the amplitude of the voltage occurring in the output circuit of the filter increases upon the change-over from the lower to the higher measuring range and therefore upon excitation of the relay the corresponding switch must be opened. In the device shown in Fig. 1 which comprises a low-pass filter use is made of a relay having a closed-circuit contact.

I claim:

1. A radio altimeter comprising means to transmit a frequency-modulated wave to be reflected from the ground, means to receive the frequency-modulated wave to produce an output signal whose frequency corresponds to the difference in the frequency of the directly received and the reflected waves, a frequency-responsive distance meter connected to the output of said receiver, said meter being provided with first and second indication ranges and voltage-responsive switching means for selecting a desired range, a filter coupled to the output of said receiver, said filter having a cut-off at a frequency between the frequencies which produce indications in said first and second ranges whereby a first output voltage of a predetermined amplitude is produced for input signals corresponding to distances within said first range and a second output voltage of a predetermined amplitude is produced for input signals corresponding to distances within said second range, and means for applying said first and second output voltages to said switching means so that said first voltage effects selection of said first range and said second voltage effects selection of said second range.

2. A radio altimeter comprising means to transmit a frequency-modulated wave to be reflected from the ground, means to receive the frequency-modulated wave to produce a sinusoidal output signal whose frequency corresponds to the difference in the frequency of the directly received and the reflected waves, a frequency-responsive distance meter connected to the output of said receiving means, said meter being provided with first and second indication ranges and a relay operated switch for selecting the desired range, a low-pass filter coupled to the output of said receiver, said filter being adapted to transmit signals therethrough corresponding to distances within one of said ranges, a rectifier coupled to the output of said filter to produce a control voltage having one value for signals within said one of said ranges and a second value for signals within the other of said ranges, and means for applying said control voltage to said relay to actuate said switch to select the appropriate range.

3. A radio altimeter, as set forth in claim 2, wherein said distance meter comprises means to convert the sinusoidal signal in the output of said receiving means to a rectangular wave of the same frequency, a half-wave rectifier, a first condenser connected in series with said rectifier, a resistance, a second condenser connected in series with said resistance across said rectifier, a current-responsive indicator connected in parallel with said second condenser, a third condenser connected in series with said relay operated switch across said first condenser, and means to apply said rectangular wave across said series connected first condenser and rectifier, whereby said meter operates in one range when said switch is closed and in another range when said switch is open.

4. An altimeter as set forth in claim 3 further including means to indicate the range which is switched-in.

5. An altimeter as set forth in claim 4 further including first and second scales in conjunction with said indicator, separate illumination means in cooperation with said scales, and means responsive to the operation of said switch to energize the illumination means for the scale selected thereby.

6. An arrangement, as set forth in claim 1, wherein said filter is constituted by a low-pass filter.

7. An arrangement, as set forth in claim 1, wherein said filter is constituted by a high-pass filter.

JACOB HENDRICH.

REFERENCES CITED

The following references are of record in the file of this patent:

UNITED STATES PATENTS

| Number | Name | Date |
| --- | --- | --- |
| 1,913,148 | Alexanderson | June 6, 1933 |
| 2,206,903 | Lane et al. | July 9, 1940 |
| 2,247,662 | Newhouse | July 1, 1941 |
| 2,257,830 | Wolff et al. | Oct. 7, 1941 |
| 2,405,597 | Miller | Aug. 13, 1946 |
| 2,417,032 | Wolff et al. | Mar. 4, 1947 |
| 2,421,785 | Hathaway | June 10, 1947 |